United States Patent
Blakeway et al.

(10) Patent No.: US 9,592,831 B2
(45) Date of Patent: Mar. 14, 2017

(54) LAUNCH CONTROL (71) Applicant: Jaguar Land Rover Limited, Whitley Coventry Warwickshire (GB)

(72) Inventors: David Blakeway, Birmingham (GB); Neil Dixon, Lutterworth (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/430,853

(22) PCT Filed: Sep. 25, 2013

(86) PCT No.: PCT/EP2013/069904
§ 371 (c)(1),
(2) Date: Mar. 24, 2015

(87) PCT Pub. No.: WO2014/048947
PCT Pub. Date: Apr. 3, 2014

(65) Prior Publication Data
US 2015/0266479 A1    Sep. 24, 2015

(30) Foreign Application Priority Data

Sep. 25, 2012  (GB) .................................. 1217112.0

(51) Int. Cl.
*B60W 10/10* (2012.01)
*B60W 30/18* (2012.01)
(Continued)

(52) U.S. Cl.
CPC ...... *B60W 30/18027* (2013.01); *B60W 10/06* (2013.01); *B60W 10/10* (2013.01);
(Continued)

(58) Field of Classification Search
CPC ......... B60W 30/18027; B60W 30/188; B60W 50/082; B60W 10/10; B60W 10/06;
(Continued)

(56) References Cited

U.S. PATENT DOCUMENTS 6,390,949 B1     5/2002  Kondo et al.
8,554,421 B2 *  10/2013  Sheriff ................ B60W 50/082
                                                           307/10.1
(Continued)

FOREIGN PATENT DOCUMENTS

DE    102007018154 A1    10/2008
DE    102010030176 A1    12/2011
(Continued)

OTHER PUBLICATIONS

Notice of Reasons for Refusal in Japanese with English summary corresponding to JP application No. 2015-532460, dated Mar. 29, 2016, 7 pages.
(Continued)

*Primary Examiner* — Roger Pang
(74) *Attorney, Agent, or Firm* — Reising Ethington P.C.

(57) ABSTRACT

The present invention relates to a launch control unit for selectively engaging a revised shift control strategy. The revised shift control strategy is operable to control an internal combustion engine and/or an automatic transmission of a motor vehicle. The launch control unit can be configured to receive a brake signal from a foot brake and a torque demand from a throttle pedal. In use, the launch control unit is operable to engage said revised shift control strategy upon receipt of a torque demand greater than or equal to an upper torque threshold within a predefined time period of receipt of a brake signal less than or equal to a lower brake threshold.

20 Claims, 5 Drawing Sheets (51) Int. Cl.
  *B60W 50/08* (2012.01)
  *B60W 10/06* (2006.01)
  *B60W 30/188* (2012.01)
  *F16H 61/02* (2006.01)
  *F16H 59/02* (2006.01)
  *F16H 59/18* (2006.01)
  *F16H 59/54* (2006.01)

(52) U.S. Cl.
  CPC ........ *B60W 30/188* (2013.01); *B60W 50/082* (2013.01); *F16H 61/0213* (2013.01); *B60W 2540/10* (2013.01); *B60W 2540/103* (2013.01); *B60W 2540/12* (2013.01); *F16H 59/18* (2013.01); *F16H 59/54* (2013.01); *F16H 2059/0226* (2013.01); *F16H 2061/023* (2013.01); *F16H 2061/0227* (2013.01); *F16H 2061/0244* (2013.01); *F16H 2312/02* (2013.01); *F16H 2312/022* (2013.01); *Y10T 477/644* (2015.01); *Y10T 477/647* (2015.01); *Y10T 477/688* (2015.01); *Y10T 477/692* (2015.01)

(58) Field of Classification Search
  CPC ......... B60W 2540/10; B60W 2540/103; F16H 2312/02; F16H 2312/022; F16H 59/18; F16H 2061/023; F16H 59/54; F16H 2059/0226; F16H 2061/0227; Y10T 477/647; Y10T 477/688; Y10T 477/692
  USPC ..................................................... 701/55, 56
  See application file for complete search history.

(56) References Cited

U.S. PATENT DOCUMENTS

| 2008/0269014 | A1* | 10/2008 | Chen ................... F16H 61/0437 477/94 |
| 2009/0143195 | A1 | 6/2009 | Katakura et al. |
| 2009/0312146 | A1 | 12/2009 | Vesenjak |
| 2010/0211254 | A1 | 8/2010 | Kimura et al. |
| 2010/0305822 | A1* | 12/2010 | Kresse ................ F16H 61/0213 701/56 |

FOREIGN PATENT DOCUMENTS

| EP | 0784171 A2 | 7/1997 |
| EP | 1916451 A1 | 4/2008 |
| EP | 2070797 A2 | 6/2009 |
| GB | 2420385 A | 5/2006 |
| JP | H01240329 A | 9/1989 |
| JP | H0858434 A | 3/1996 |
| JP | 2001065679 A | 3/2001 |
| JP | 2009133468 A | 6/2009 |
| JP | 2010241243 A | 10/2010 |

OTHER PUBLICATIONS

GB Combined Search and Examination Report for corresponding application No. 1217112.0, dated Jan. 23, 2013, 6 pages.
International Search Report for application No. PCT/EP2013/069904, dated Dec. 20, 2013, 6 pages.
Written Opinion for application No. PCT/EP2013/069904, dated Jan. 23, 2013, 7 pages.

* cited by examiner

| Dynamic launch ready | Select D |
|---|---|
| | Select dynamic mode |
| | Optional, select sport mode or tip mode |
| | Driver to apply light to moderate pressure on the foot brake, then lightly press the throttle pedal |
| | Engine rpm over 1000rpm |
| | The instrument pack indicates "Dynamic launch ready" |
| | Avoid too high throttle pedal as that can force the power unit into a protection mode |
| Dynamic launch active | Release the foot brake and quickly press the throttle pedal to full throttle and through the kick down detent |
| | The instrument pack indicate "Dynamic launch active" |
| | If KD is maintained, display seen until 7th gear and maximum vehicle speed |
| | If tip is selected and driver programmable dynamic has no automatic upshifts selected, whilst dynamic launch is active automatic upshifts will occur, auto upshifts will occur up to 7th gear and maximum vehicle speed if the throttle pedal is held through the KD detent. |
| | An acceleration boost will be felt during 1-2 and 2-3 shifts. |
| Dynamic launch no indication | The instrument pack has no indication for inhibited or aborted events |
| | Typical reasons why is might not be allowed: |
| | Time since last dynamic launch event over 30 seconds |
| | Steering angle high at stand still or during acceleration. |
| | Power unit went into a protection mode due to high throttle when brake is applied. |
| | Release throttle pedal during acceleration |

FIG. 1

| Phase | | |
|---|---|---|
| Set-up phase | Driver action | Select D |
| | | Select dynamic |
| | | Optional, select sport mode |
| | | Optional, select tip mode, tip auto up shifts allowed |
| | | Traction/DSC selection does not impact Dynamic launch (cal possible, but not used) |
| | | Steering angle below 45 Degree |
| | | Apply light to moderate brake pressure, minimum 2bar |
| | | Apply light to moderate throttle pedal, over 10% |
| | Display | Dynamic launch ready |
| | Inhibit or exit conditions | Throttle pedal drops below 5% |
| | | Brake pressure drop below 2bar |
| | | Steering angle goes above 45 Degrees |
| | | Gear box oil temperature below 30 or above 100 Deg C |
| | | A-MAX event counter below 65535 above 65535 |
| | | Vehicle speed goes above 20mph (32kph, prop shaft 850rpm) |
| | | High throttle pedal after 5 seconds will activate powertrain protection mode. |
| Launch phase | Driver action | Release the brake |
| | | Apply full throttle (100%) pedal throu the KD detent within 1.5 seconds of releasing the brake |
| | Display | Dynamic launch |
| | Exit conditions | Throttle pedal KD detent released, ie pedal below 100% |
| | | Vehicle speed goes above 20mph (32kph, prop shaft 850rpm) before the brake is released |
| | | Steering angle goes above 90 Degrees |
| Acceleration phase | Driver action | Hold throttle pedal through the detent |
| | | Note: tip shifts are allowed. |
| | | If tip is selected and driver programmable dynamic has no automatic upshifts selected, whilst dynamic launch is active automatic upshifts will occur, auto upshifts will occur up to 7th gear and maximum vehicle speed if the throttle pedal is held through the KD detent. |
| | Display | Dynamic launch |
| | | If KD is maintained, display seen until 7th gear and maximum vehicle speed |
| | | Amber warning not displayed in tip mode & A-MAX active, after KD is released amber upshift warning reactivated. |
| | Exit conditions | Throttle pedal KD detent released, ie pedal below 100%. |
| | | Driver disable dynamic mode |
| | | Steering angle goes above 90 Degrees |
| | | A-MAX events limited to 65535, effectively unlimited |
| | | Dynamic launch not allowed for 30 seconds after exit last dynamic launch event. |
| | | No display information if Dynamic launch is not allowed |

FIG. 2

FIG. 3 (CHART A)

FIG. 4 (CHART B)

Figure 5

LAUNCH CONTROL

TECHNICAL FIELD

The present invention relates to launch control of a motor vehicle, in particular, the present invention relates to a launch control unit; a method of controlling engagement of a revised shift control strategy; a processor; and a motor vehicle.

BACKGROUND OF THE INVENTION

It is known to provide motor vehicles with a launch control system for launching the vehicle from a stationary position. The launch control system typically controls speed of an internal combustion engine and transmission upshifts, for example through a dual-clutch transmission. The launch control system is activated, for example by pressing a launch control button and selecting a sport operating mode for the vehicle. The toot brake is then applied to hold the vehicle stationary and the throttle pedal is depressed. The throttle pedal, is typically depressed to a kickdown position to increase the engine speed. The launch control system controls the engine speed, for example at a constant 4000 rmp, but the engine speed could be higher or lower. The driver then rapidly releases the brake pedal allowing the vehicle to accelerate. The traction control system can subsequently control engine speed to reduce or minimise wheelspin and control transmission upshifts as the vehicle speed increases. The clutch pressure can be controlled to allow slip to occur between friction surfaces to control the delivery of torque.

The torque demand resulting from depressing the throttle pedal to the kickdown position places a high load on the engine. The subsequent engagement of the transmission at high engine speed can provide a considerable mechanical load, for example causing heating and wear of the transmission clutches. Moreover, this launch strategy may not be suitable for vehicles having a torque converter which provides a fluid coupling for an automatic transmission. For example, unlike a dual-clutch transmission, it is not possible with a torque converter to control torque delivery by varying the clutch pressure.

The present invention, at least in certain embodiments, sets out to overcome or ameliorate some of the aforementioned shortcomings of prior art launch control units.

SUMMARY OF THE INVENTION

Aspects of the present invention relate to a launch control unit; a method of controlling engagement of a revised shift control strategy; a processor; and a motor vehicle as claimed in the appended claims. The launch control unit according to the present invention has particular application in controlling an automate transmission and/or an internal combustion engine.

Viewed from a further aspect, the present invention relates to a controller, or a launch control unit, for selectively engaging a revised shift control strategy operable to control an internal combustion engine and/or an automatic transmission of a motor vehicle;

The controller or launch control unit being configured to receive a brake signal from a foot brake and a torque demand from a throttle pedal;
wherein the controller or launch control unit is operable to engage said revised shift control strategy upon receipt of a torque demand greater than or equal to an upper torque threshold within a predefined time period of receipt of a brake signal less than or equal to a lower brake threshold.

A standard shift control strategy is implemented for normal driving scenarios and the launch control unit enables the revised shift control strategy to be selectively engaged, for example during a vehicle performance test. In one embodiment, the revised shift control strategy can be configured to improve vehicle acceleration. The launch control unit has particular application in controlling the internal combustion engine and/or the automatic transmission during transmission shifts (gear changes). The revised shift control strategy can, for example, modify the duration of a transmission shift (to increase/decrease duration) and/or modify the engine output during the transmission shift (to increase/decrease torque delivered during the transmission shift). At least in certain embodiments, the revised shift control strategy can reduce vehicle acceleration times. The launch control unit provides an intuitive user interface for engaging the revised shift control strategy. The revised shift control strategy can form part of a dynamic launch control.

The launch control unit can be configured to maintain engagement of the revised shift control strategy as long as the torque demand is greater than or equal to the upper torque threshold. If the torque demand drops below the upper torque threshold, the revised shift control strategy can be dis-engaged.

The launch control unit can be configured to perform a set-up phase prior to engagement of the revised shift control strategy. The set-up phase can comprise detecting a predefined brake signal and/or a predefined torque demand. For example, the set-up phase can comprise a brake signal greater than or equal to a lower brake threshold at the same time as a torque demand greater than or equal to a lower torque threshold. The revised shift control strategy can be primed once the set-up phase has been completed.

The launch control unit can be configured to allow the driver to control engine speed during the set-up phase to satisfy the predefined torque demand. The launch control unit could optionally output instructions to the driver to set the engine speed to a particular level or within a particular range. Alternatively, the launch control unit could be configured automatically to control engine speed, for example to maintain the engine speed at a particular level or within an operating range during the set-up phase suitable for improving vehicle acceleration. The engine speed can be controlled to reduce or avoid wheel slip while a pressure is applied to the brake pedal to hold the vehicle stationary. The launch control unit could optionally also provide instructions to the driver to control the application of pressure to the brake pedal during the set-up phase.

The launch control unit can be configured to control operation of the transmission and/or the internal combustion engine during transmission upshifts when the revised shift control strategy is engaged. For example, the launch control unit can control the duration of the transmission shift and/or the engine speed during the shift. The launch control unit can, for example, increase the time period over which the shift is performed and/or decrease or eliminate a torque reduction during the shift.

The launch controller can be configured to perform automatic transmission upshifts when the revised shift control strategy is engaged. The launch control unit can calculate the optimum time to perform the upshift, for example based on engine speed and/or the available traction. The calculation can, for example, be based on a reaction time to predict the peak engine speed (rpm) during a transmission upshift; and/or a time delay from an upshift request to ratio start and peak engine speed (rpm).

If a traction event (such as wheel slip) is defected during the vehicle launch, a traction control system may operate to reduce the engine torque. The launch control unit could be calibrated such that the timings of transmission upshifts do not coincide with a reduction in engine torque by the traction control system. Equally, the launch control unit could be calibrated such that the timings of transmission upshifts do not coincide with a possible traction event (at least on a dry road surface). The launch control unit can be configured to maintain the revised shift control strategy engaged even if a traction event is detected.

A controller, such as a paddle or a button, can be provided to allow the driver manually to initiate a transmission shift (either up or down), referred to herein as a 'manual shift'. A manual shift may be performed only when the vehicle is in an operating mode which permits manual control, such as a Drive mode or a Sport mode. The launch control unit can be configured to allow manual shifts to be performed with the revised shift control strategy engaged. For example, the controller could be used by the driver to perform manual shifts. The launch control unit could be configured to allow only some of the shifts to be manual shifts and the remaining shifts to be automated. For example, the launch control unit could be configured to permit the driver to perform a manual shift to engage $1^{st}$ gear (which could be inhibited based on vehicle speed, for example to permit $1^{st}$ gear to be engaged only when the vehicle is stationary or below a defined speed threshold) and the subsequent shifts to be performed automatically. The launch control unit can be configured to retain automated control of the transmission upshifts when the revised shift control strategy is engaged. For example, if the launch control unit determines that the driver has delayed an upshift unnecessarily, the launch control unit can implement the upshift. The automated control of the transmission upshifts can be inhibited when the revised shift control strategy is disengaged.

The launch control unit can be configured to define the upper torque threshold as one of the following: (a) a maximum throttle input; (b) a predefined proportion of a maximum throttle input; or (c) a throttle kickdown position. The throttle kickdown position corresponds to a throttle pedal position for forcing a downshift. A detent or the like can be provided to mark the kickdown position. The kickdown position can be detected by a sensor which may be calibratable. A solenoid or other actuator can be provided to provide adjustable feedback when the throttle pedal reaches or exceeds the kickdown position.

The launch control unit can be configured to inhibit engagement of the revised shift control strategy if one or more of the following events is detected: (a) the torque demand does not exceed said upper torque threshold within the predefined time period; (b) the torque demand falls below a lower torque threshold; (c) a vehicle speed is greater than or equal to a predefined speed limit before the revised shift control strategy is engaged; (d) an engine speed exceeds a predefined engine limit; (e) a steering angle exceeds a pre-defined angle; (f) a pre-defined time period since the previous engagement of said revised shift control strategy has not expired; (g) an oil temperature is outside a pre-defined operating range; and (h) a pre-defined driving mode is not selected. The launch control unit can foe configured to inhibit engagement of the revised shift control strategy when older events are detected, modelled or predicted.

The launch control unit can be configured to disengage the revised shift control strategy if one or more of the following events is detected: (a) the torque demand falls below said upper torque threshold; (b) an engine speed exceeds a predefined engine limit; (c) a steering angle exceeds a pre-defined angle; (d) a pre-defined time period since the previous engagement of said revised shift control strategy has not elapsed; (e) a brake signal is received; and (f) a measured vehicle speed is greater than or equal to a defined maximum vehicle speed.

The lower brake threshold can correspond to the vehicle foot brake being partially or completely released.

The lower torque threshold can correspond to an engine speed which is equal to the stall speed of a torque converter for coupling the internal combustion engine to the automatic transmission. Alternatively, the lower torque threshold can correspond to an engine speed which is less than the stall speed of the torque converter, a condition which is referred to herein as a "partial stall" condition. This partial stall condition can provide an improved launch for a torque converter transmission. In particular, the partial stall condition helps to avoid engagement of an engine protection mode which may otherwise result from operating the engine at a speed corresponding to the stall speed of the torque converter over a relatively short time period (for example, a matter of seconds). Setting the lower torque threshold, such that the corresponding engine speed is below the stall speed can also avoid the need to reduce engine speed to protect the transmission while the vehicle is held at rest. This can also provide improved control for the driver as the delivery of less engine torque (than would result from setting the lower torque threshold at an engine speed corresponding to the stall speed of the torque converter) reduces the brake pressure required to hold the vehicle stationary (which can be exacerbated by the torque multiplication function of the torque converter). The revised shift control strategy can be disengaged or inhibited if torque converter stall protection event is active (for example resulting from the engine torque exceeding an operating limit of the torque converter). The revised shift control strategy can be disengaged if torque converter stall occurs for a predetermined time period (for example greater than or equal to 5 seconds).

The launch control unit described herein can be a separate control module, for example implemented on a microprocessor. Alternatively, the launch control unit can form part of another vehicle system, such as the engine control unit.

In a further aspect, the present invention relates to a motor vehicle comprising a launch control unit as described herein.

In a still further aspect the present invention relates to a method of controlling engagement of a revised shift control strategy for controlling an internal combustion engine and/or an automatic transmission of a motor vehicle; wherein the method comprises engaging said revised shift control strategy when a torque demand greater than or equal to an upper torque threshold is detected within a predefined time of a reduction in a brake signal to less than or equal to a lower brake threshold.

The method can include a set-up phase comprising an increase in the brake signal above a brake threshold and a concurrent increase in the torque demand above a lower torque threshold.

The method can also comprise maintaining said revised shift control strategy engaged when the torque demand is above said upper torque threshold; and/or inhibiting or dis-engaging the revised shift control strategy if the torque demand decreases below said upper torque threshold.

The method can comprise inhibiting engagement of the revised shift control strategy or dis-engaging said revised shift control strategy if the torque demand does not exceed said upper torque threshold within said predefined time period.

The upper torque threshold can correspond to a maximum throttle input or a predefined proportion of said maximum throttle input. The upper torque threshold can correspond to a fully depressed throttle pedal or a throttle kickdown position.

The step of detecting the reduction in the brake signal can comprise determining when a vehicle brake is partly or completely released.

The method can comprise initiating a cool-down period following engagement of the revised shift control strategy. The revised shift control strategy cannot be re-engaged during the cool-down period. The cool-down period can be predefined or can be calculated, for example based on a measured or modelled temperature.

A data processor programmed to perform a set of defined instructions to perform the method as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 2 shows a summary of the entry and exit conditions of the revised shift control strategy;

DETAILED DESCRIPTION

A launch control unit for controlling operation of an automatic transmission of a motor vehicle in accordance with the present invention will now be described. The launch control unit is configured selectively to engage a revised shift control strategy to provide dynamic launch control of the vehicle. The revised shift control strategy is configured to provide improved vehicle acceleration from a stationary or low speed start. The revised shift control strategy enables a driver to complete vehicle performance tests, such as recording vehicle performance times from 0 to 100 km/h (0-62 mph).

The launch control unit in the present embodiment is provided in a motor vehicle having an internal combustion engine coupled to an automatic transmission by a torque converter. The torque converter includes a torque converter clutch for locking the torque converter when the input and output speeds are close to each other. The transmission is conventional and comprises internal clutches for engaging/disengaging gears during transmission shifts (either upshifts or downshifts). The automatic transmission has eight speeds, but the invention is not limited in this respect. In alternate embodiments, the launch control unit can also be employed in hybrid vehicles, for example comprising an internal combustion engine end one or more electric or mechanical traction machines (such as an electric motor or a flywheel) for supplying torque to one or more driven wheels.

The launch control unit is in electronic communication with vehicle systems over a communication bus, such as a CAN bus, LIN bus or FLEXRAY communication system. In particular, the launch control unit receives a brake signal and an engine torque request. The vehicle braking is controlled by a foot brake operating a hydraulic brake system and the brake signal is a measure of the hydraulic pressure (bar). The engine torque request is defined as a percentage (%) of the maximum available engine torque and relates to the position of a throttle pedal. The throttle pedal has a kickdown (KD) detent and depressing the throttle pedal beyond this detent forces a downshift in the transmission. A solenoid is provided to allow the position of the kickdown detent to be calibrated for a driver.

The launch control unit is configured to control operation of the transmission and the engine to perform up/down transmission shifts. During an upshift, a conventional transmission shift control strategy applies a torque reduction to the engine to deliver smooth or fast gear shifts. Although desirable under normal driving conditions, this strategy does not optimise vehicle acceleration. To improve acceleration, a revised transmission shift control strategy can be implemented in which an amount of torque reduction implemented during a transmission upshift is reduced/lowered relative to a normal shift operation. The revised transmission shift control strategy can optionally be combined with a longer shift time, allowing the engine inertia torque to deliver an acceleration boost during an upshift. The revised transmission shift control strategy is suitable for use in the vehicle shift control strategy to provide improved acceleration, for example during a performance test. A suitable revised transmission shift control strategy has been developed by ZF Friedrichshafen AG, 88038 Friedrichshafen, Deutschland, Germany. Accordingly, the launch control unit can optionally be configured to engage the revised transmission shift control strategy only when the torque demand exceeds a predefined threshold (for example, greater than or equal to 90%, 95% or 100%).

The launch control unit provides a human machine interface (HMI) for selectively engaging the vehicle shift control strategy to implement the revised transmission shift control strategy which eliminates torque reduction during transmissions upshifts. The launch control unit operates in three phases: a set-up phase, a launch phase and an acceleration phase. The operation of the launch control unit in each phase will now be described with reference to the accompanying Figures.

Figure 1:
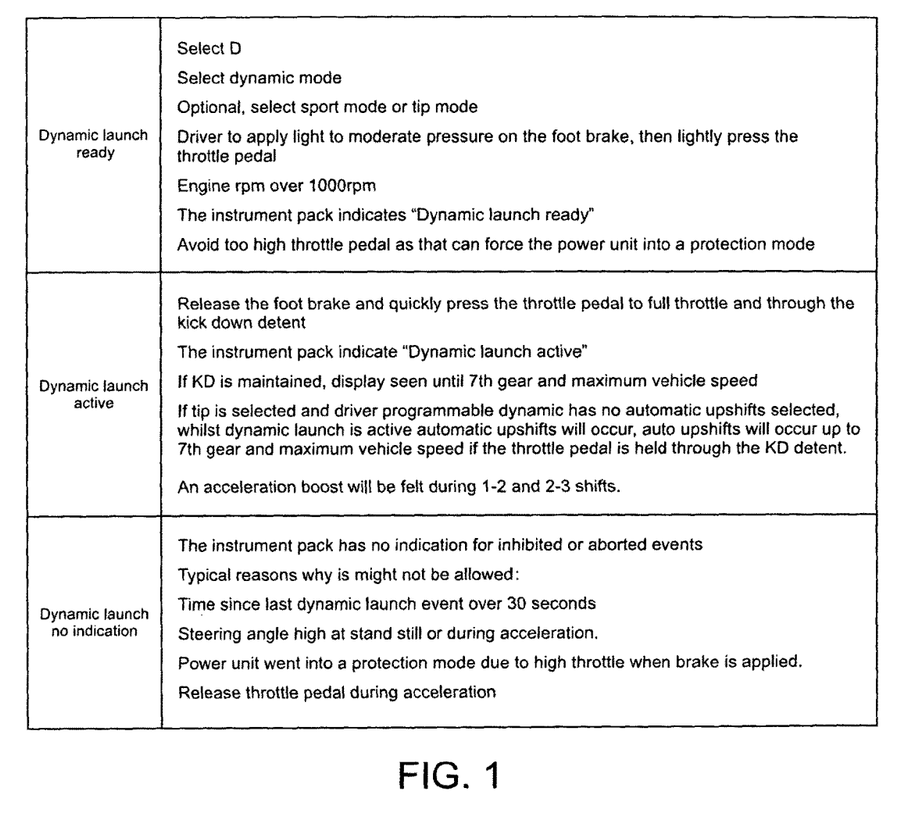
FIG. 1 shows a summary of the procedure for engaging a revised shift control strategy according to the present invention.

As shown in FIGS. 1 and 2, the set-up phase comprises a driver action component; an output display component; and an inhibit/exit component. The driver action component allows the driver to prime the launch control unit by selecting Drive (D) or Sport (S). The driver then selects the vehicle operating mode, for example a dynamic mode or a sport mode. Alternatively, the driver could select a manual shift mode which enables manual up/down shifts. In the present embodiment, automatic upshifts are enabled irrespective of the operating mode selected by the driver. To prime the launch control unit, the driver applies light to moderate pressure on the foot brake [with the left foot] and simultaneously applies light pressure on the throttle pedal [with the right foot] to generate a torque demand. The launch determines when the brake signal is greater than or equal to a lower brake threshold (at least 2 bar and optionally at least 5 bar) and when the torque demand is greater than or equal to a lower torque demand threshold (typically greater than 5% or 10%). The generated torque demand causes the engine speed to increase (typically above 1000 rpm) and, as the vehicle is prevented from moving by the brake system, the torque converter operates in a partial or full stall phase. The lower torque threshold may be calibrated to set the engine speed to increase or maximise the torque multiplication provided by the torque converter when the vehicle starts to move. The set-up phase should be completed while the vehicle is stationary or below a minimum vehicle speed threshold. The response of the torque converter can vary depending on the rate of engine response upon release of the vehicle brakes.

When the launch control unit determines that each of these steps has successfully been completed, the revised shift control strategy is engaged and a driver notification, for example "Dynamic Launch Ready", is output for display on an instrument cluster or a message centre. During the set-up phase, the launch control unit can inhibit engagement of the revised shift control strategy or exit the revised shift control strategy if one or more of the following events is detected:
  (i) The torque demand drops below a cut-off torque threshold (for example 5%);
  (ii) The brake signal drops below the lower brake threshold (for example 2 bar);
  (iii) A steering angle exceeds a steering threshold (for example greater than 45°);
  (iv) The oil temperature in the transmission is above or below a predefined operating temperature range (for example between 30° C. and 100° C.);
  (v) A revised shift control strategy counter indicates that the number of shift control strategy events exceeds a predefined limit (for example more than 65535 events);
  (vi) A detected vehicle speed or propeller shaft speed exceeds a predefined limit (for example the vehicle speed exceeds 20 mph (32 kph) or the propeller shaft speed exceeds 850 rpm);
  (vii) A powertrain protection mode determines a high throttle pedal exceeding a predefined time limit while the vehicle is stationary or below a vehicle speed limit (for example greater than or equal to 5 seconds).

The launch control unit will disengage or inhibit the revised shift control strategy if any of these events are detected and the driver will have to repeat the set-up phase. If the launch control unit does not detect any of these events, the revised shift control strategy remains engaged and the transmission shift control strategy is active. A manual shift mode can be selected during the set-up phase to allow the user to perform manual shifts using manual gear selectors (such as paddles).

After the set-up phase has been completed, the launch phase is activated if the launch control unit detects: (i) a reduction in the brake signal below a lower brake threshold; combined with (ii) an increase in the torque demand to or above an upper torque threshold within a predefined time period following the brake signal dropping below the lower brake threshold. The reduction in the brake signal and the increase in the torque demand can occur substantially simultaneously or consecutively (for example, the increase in the torque demand above the upper torque threshold can occur before, after or simultaneously with the reduction in the brake signal below said lower brake threshold). In the present embodiment, the launch control unit engages the launch phase if the brake signal decreases to zero (i.e. the foot brake is released) and the torque demand increases to 100% (i.e. full throttle) within 1.5 seconds of the release of the foot brake. The kickdown detent on the throttle pedal can correspond to a torque demand of 100% and, therefore, provides the driver with haptic feedback. When the launch control unit determines that the launch phase has been completed, the revised shift control strategy is engaged together with the revised shift control strategy. A driver notification, for example "Dynamic Launch Active", is output for display on the instrument cluster or message centre.

During the launch phase, the launch control unit can exit the revised shift control strategy if one or more of the following events is defected:
  (i) The torque demand drops below the upper torque threshold (for example the driver does not hold the throttle pedal through the kickdown detent);
  (ii) The detected vehicle speed or propeller shaft speed exceeds a predefined limit (for example the vehicle speed exceeds 20 mph (32 kph) or the propeller shaft speed exceeds 850 rpm);
  (iii) The steering angle exceeds a steering threshold (for example a steering wheel angle greater than 30°, 45°, 60° or 90°);
  (iv) A transmission downshift is requested manually; and
  (v) A transmission upshift is requested manually during the launch phase without having pre-selected a manual shift mode.

During the launch phase, the launch control unit according to the present embodiment permits manual selection of $1^{st}$ while the vehicle is stationary (or below a minimum speed threshold), provided the manual shift mode is pre-selected during the set-up phase if the manual shift mode is not pre-selected, a manual shift request during the launch phase (or during the subsequent acceleration phase) will cause the launch control unit to exit the revised shift control strategy. Automatic upshifts are enabled irrespective of whether the manual shift mode is selected by the driver.

Following the launch phase, the launch control unit enters the acceleration phase during which the motor vehicle accelerates from a stationary position. The revised shift control strategy remains engaged provided the torque demand remains above the upper torque threshold (100% in the present embodiment). As such, the revised transmission shift control strategy can be applied for each consecutive gear change (i.e., up to $8^{th}$ gear) as the vehicle accelerates to its maximum speed (which may be achieved before the transmission shifts into its highest gear, for example the maximum vehicle speed may be reached in $7^{th}$ gear). A driver notification, for example "Dynamic Launch Active", is displayed on the instrument cluster or the message centre throughout the acceleration phase. An upshift warning, such as an amber light on the instrument cluster, can optionally be suppressed during the acceleration phase.

During the acceleration phase, the launch control unit can exit the revised shift control strategy if one or more of the following events is detected:
  (i) The defected torque demand drops below the tipper torque threshold, for example as a result of the driver lifting the throttle pedal;
  (ii) The driver disables the dynamic vehicle operating mode;

(iii) The steering angle exceeds a steering threshold (for example a steering wheel angle greater than 30°, 45°, 60° or 90°);

(iv) A measured vehicle speed is equal to or greater than a calibratable vehicle speed, for example the vehicle speed reaches a defined $V_{MAX}$ or a predefined proportion thereof.

A revised shift control strategy counter is provided to count the number of shift control strategy events and engagement of the revised shift control strategy can be inhibited if the total number exceeds a predefined limit (in the present embodiment the limit is set as 65535 events). Also, to allow heat dissipation, engagement of the revised shift control strategy is inhibited for a time period, for example 30 seconds, between event cycles. A driver notification could optionally be output to the instrument cluster or the message centre to notify the driver that the revised shift control strategy cannot be engaged.

The revised shift control strategy according to the present embodiment implements the revised shift control strategy for each transmission upshift (i.e. shifts 1-2, 2-3, 3-4, 4-5, 5-6, 6-7 and 7-8) to maintain torque application during the upshift to increase vehicle acceleration. However, this control strategy could be implemented for only some of the upshifts, for example 1-2 and 2-3, and a conventional strategy adopted for the remaining upshifts, for example 3-4, 4-5, 5-6, 6-7 and 7-8. It will be appreciated, therefore, that the revised shift control strategy can be calibrated for a particular vehicle.

Figure 3:
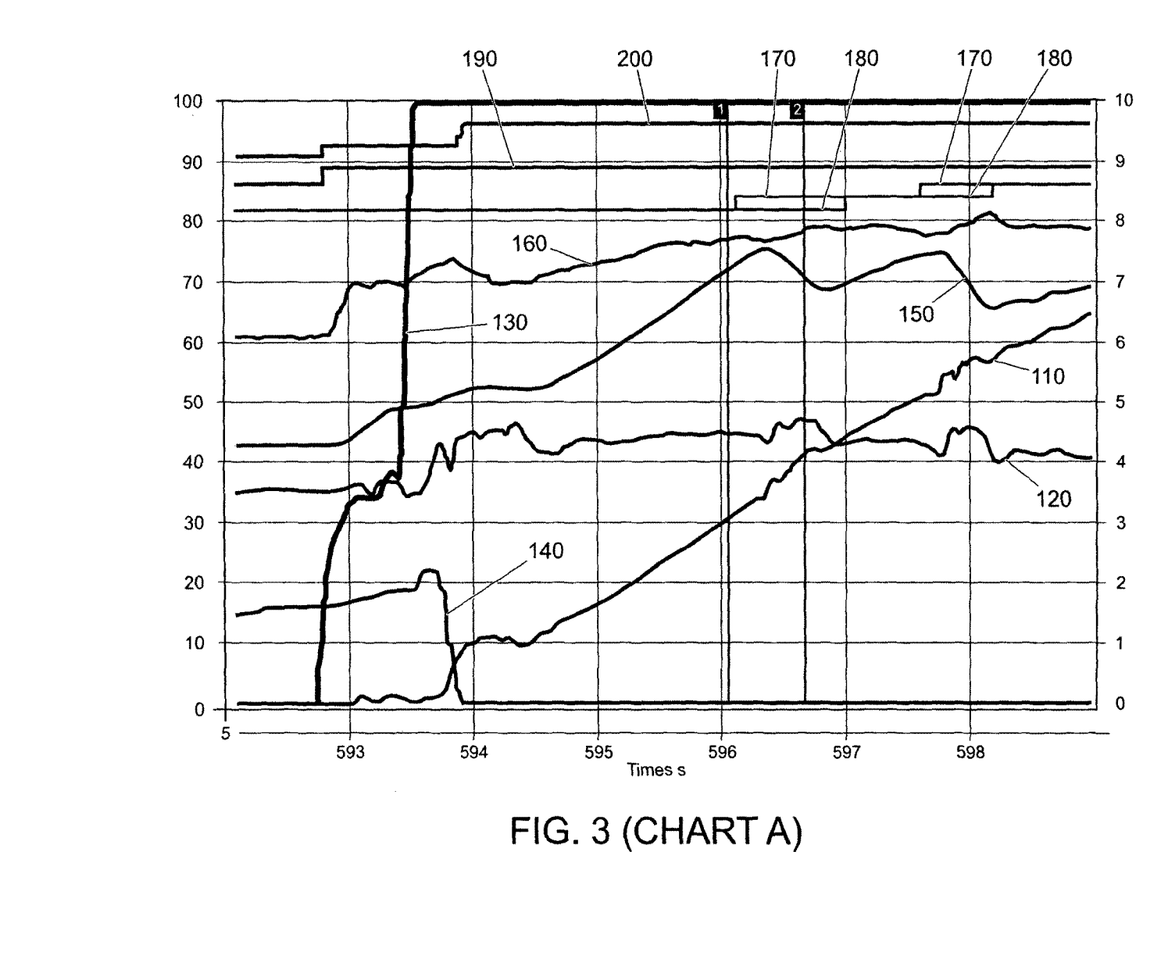
FIG. 3 shows a first chart showing operating parameters of a motor vehicle during set-up, launch and acceleration phases of the present invention.

The operation of the launch control unit in accordance with the present invention will now be described with reference to first and second charts A, B shown in FIGS. 3 and 4 respectively. The first and second charts A, B show the operating parameters of a motor vehicle during the launch and acceleration phases in relation to time (seconds). The vehicle operating parameters are represented as follows:

1. A vehicle speed plot 110 shows the vehicle speed (n_ab.iltflnput);
2. An acceleration plot 120 shows the vehicle acceleration (accel_filt);
3. A torque demand plot 130 shows the torque demand (dki.iltflnput);
4. A brake pressure plot 140 shows the brake signal (FP_BPR);
5. An engine speed plot 150 shows the engine speed (MOT_NMO);
6. An engine torque plot 160 shows the engine torque (me_red_abs);
7. A gear request plot 170 shows the requested transmission gear (GETR_RGA_DEST);
8. A current gear plot 180 shows the current transmission gear (GETR_RGA_CUR);
9. A revised shift control strategy status plot 190 shows the revised shift control strategy status (FZNAB_StSpActive) indicating when the revised shift control strategy is active; and
10. A revised shift control strategy state plot 200 shows the revised shift control strategy state (FZNAB_StateSISP) indicating when the revised shift control strategy is engaged.

Having completed the set-up phase, the driver applies a constant light pressure to the brake pedal and the brake signal is non-zero (brake pressure plot 140) while the vehicle is stationary (vehicle speed plot 110). The driver initially is not applying pressure to the throttle pedal and the torque request (torque demand plot 130) is zero. The driver then applies a moderate pressure to the throttle pedal and the torque demand (torque demand plot 130) increases. The set-up phase is completed and the revised shift control strategy activated (shift control strategy status plot 190) when the brake signal (brake pressure plot 140) is above the lower brake threshold and the torque demand (torque demand plot 130) is above the lower torque threshold. During this phase, the combined application of pressure to the brake pedal and the throttle pedal causes a torque converter slip condition while the vehicle remains stationary. The torque converter clutch is unlocked and a static torque is supplied to the transmission as the engine speed increases. The transmission clutches are locked and the static torque is held in the transmission against the braking force applied at the wheels.

The driver then depresses the throttle pedal beyond the kickdown detent and the torque demand increases to 100% (engine torque plot 180). At least substantially simultaneously, the driver releases the brake pedal and the brake signal (brake pressure plot 140) decreases to zero. The launch control unit determines that the torque demand (engine torque plot 160) has exceeded the upper torque threshold within the defined time period of 1.5 seconds immediately following the brake signal (brake pressure plot 140) dropping to zero bar. Consequently, the launch control unit engages the vehicle shift control strategy (shift control strategy state plot 200) to implement the revised transmission shift control strategy. It will be noted that, before the brake pedal is released, a small amount of wheel slip may occur (illustrated in FIG. 3 by an increase in the detected vehicle speed represented by the vehicle speed plot 110) and this may optionally be controlled by a traction control system. After the brake pedal is released and the vehicle starts moving, the torque converter continues to slip (unlocked) until the input and output speeds of the torque converter are close and the torque converter clutch locks. The torque converter slip and locking of the torque converter occurs independently of the transmission shift points.

The throttle pedal is held beyond the kickdown detent and torque demand is constant at 100% (engine torque plot 100) so the revised shift, control strategy remains engaged (shift control strategy state plot 200). The vehicle accelerates (acceleration plot 120) and its speed increases (vehicle speed plot 110). The launch control unit predicts the appropriate time to perform a transmission upshift (gear request plot 170) and, as the revised shift control strategy is engaged (shift control strategy state plot 200), controls the engine to maintain or increase the delivered torque (engine torque plot 180) during the transmission upshifts.

Provided the throttle pedal remains beyond the kickdown detent (i.e. 100% throttle demand), the revised shift control strategy remains engaged through each transmission upshift until the vehicle reaches its maximum speed. If will be appreciated that only the first two transmission upshifts (1-2 and 2-3) are shown in FIG. 3.

Figure 4:
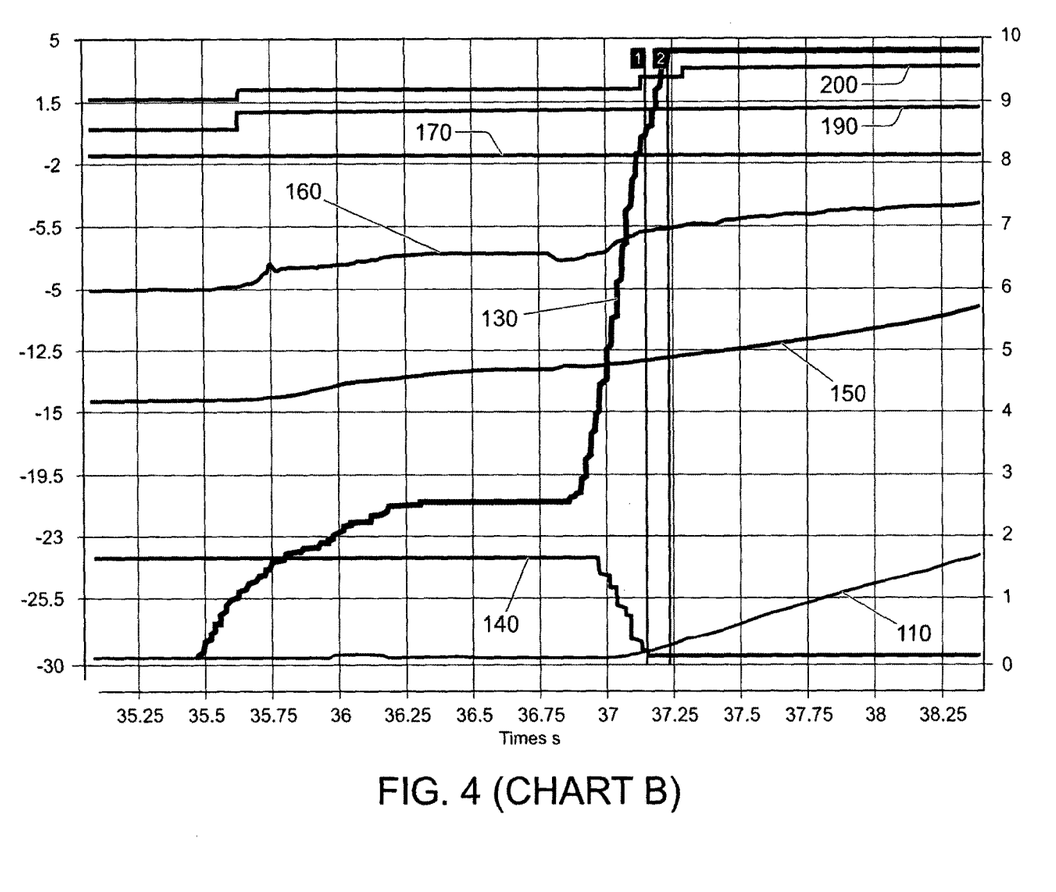
FIG. 4 shows a second chart showing the operating parameters during a launch phase.

The second chart B shown in FIG. 4 shows an enlarged view of the operating parameters during the launch phase. The release of the brake pedal and application of pressure to the throttle pedal occur substantially simultaneously in the second chart B. The vehicle accelerates from a stationary position with a minimum of wheel spin, thereby providing improved acceleration. The torque demand launch control unit engages the revised shift control strategy when the throttle pedal is depressed beyond the kickdown detent (i.e. 100% torque demand) and the revised transmission shift control strategy is applied for each subsequent upshift.

The revised transmission shift control strategy can improve the acceleration of the vehicle, for example in a performance test the time taken to accelerate from 0-100 km/h (0-62 mph) can be reduced. Moreover, it is believed that the launch control unit according to the present invention provides an intuitive interlace for the driver.

The launch control unit according to the present invention could be modified to output instructions to the driver at each stage in the process. Moreover, the launch control unit could provide coaching tips or suggestions to the driver to improve performance. For example, the launch control unit could suggest an optimum engine speed to be achieved before the foot brake is released.

Figure 5:
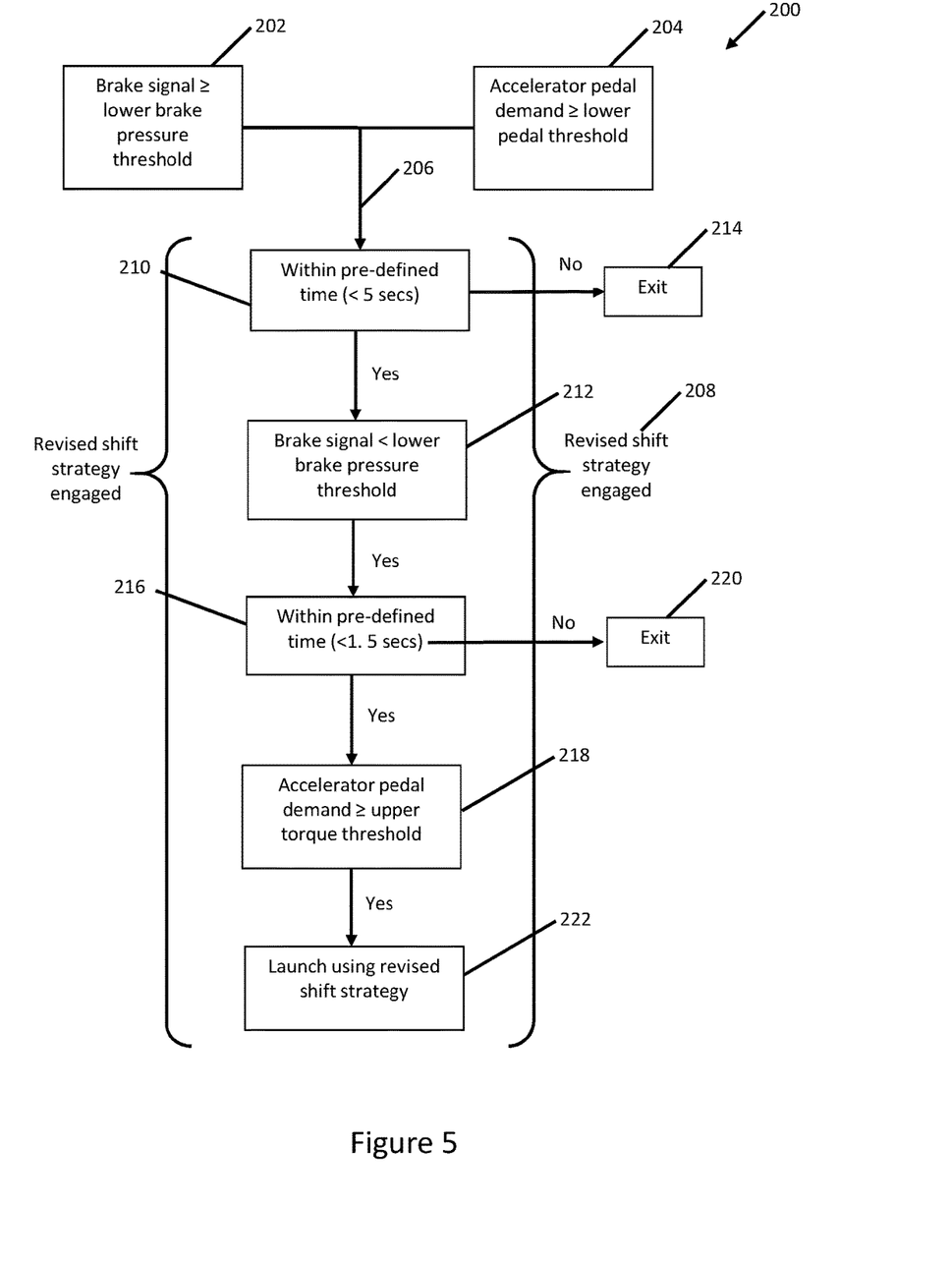
FIG. 5 shows a method according to an embodiment of the present invention.

FIG. 5 shows steps of a method 200 according to an embodiment of the present invention. The method 200 controls engagement of a revised shift control strategy for controlling an internal combustion engine and/or an automatic transmission of a motor vehicle (not shown). The method can therefore be carried out by the launch control unit as described above. At 202 and 204 the method comprises determining that a brake signal generated by a driver is greater than or equal to a lower brake threshold, and determining that an accelerator pedal demand generated by the driver is greater than or equal to a lower pedal threshold, respectively. If both 202 and 204 are satisfied, the method proceeds along path 200 where a revised shift strategy, as hereinbefore described, is engaged 208.

Engagement of the revised shift strategy should be understood to mean that either, the motor vehicle is configured to adopt the revised shift strategy so that when the motor vehicle is driven it will operate using the revised shift strategy, or, when the motor vehicle is driven, the revised shift strategy will be used. It should be appreciated therefore that engagement of the revised shift strategy does not require the vehicle to be driven, for example, not be stationary.

On proceeding along the path 206, the method comprises a first timing step 210. The first timing step is satisfied when within a pre-defined time, for example 5 seconds, the method determines that the brake signal has been lowered below the lower brake pressure threshold at 212. This step 212 is indicative that the driver wants the vehicle to move or accelerate. If the pre-defined time limit expires, for example, 5 seconds elapse, the method disengages the revised shift strategy and proceeds to 214. On satisfying step 212, the method proceeds to a second timing step 218. The second timing step is satisfied when within a pre-defined time, for example 1.5 seconds, the method determines that the accelerator pedal demand is equal to, or greater than, a high pedal threshold at 218. This step 218 is indicative that the driver wants the vehicle to accelerate quickly using the revised shift strategy. If the pre-defined time limit expires, for example, 1.5 seconds elapse, the method disengages the revised shift strategy and proceeds to 220. On satisfying step 218, the method proceed to 222 where the vehicle is launched, or accelerates, using the revised shift strategy.

From FIG. 5, it should be understood that engagement of the revised shift strategy may not be observed until step 222 because this is where the revised shift strategy is used to shift gears. Therefore, step 222 may be referred to as engagement of the revised shift strategy. However, the revised shift strategy may be engaged, for example entered into a vehicle control unit, on reaching step 210.

FIG. 5 does not show all of the exit pathways to exit the revised shift strategy. These have been discussed above in relation to the launch control unit and the method may include exit pathways to inhibit or disengage the revised shift strategy.

The launch control unit has been described herein as having fixed brake and torque thresholds. However, the brake threshold(s) and/or the torque threshold(s) could be modified dynamically, for example in response to ambient temperature, available traction, surface conditions (such as dry, damp or wet conditions) or surface type. The launch control unit could be configured automatically to detect one or more of these parameters or they could be specified by the driver. A driver override could be provided for any such automatic parameter detection, for example to enable the driver to select a particular parameter even if the launch control unit identifies a different parameter. The selected parameter could be displayed on the instrument cluster or a message centre along with any override information. The launch control system could also be configured to modify the brake threshold(s) and/or the torque thresholds) based on vehicle parameters, such as tyre pressure, tyre temperature, and tread status. The vehicle parameter's could be measured or modelled. The launch control system could also be configured to invoke a special traction control (DCS) mode tailored to the current operating conditions.

Torque demand has been described herein as a percentage (%) of the maximum possible torque demand. It will be appreciated that equivalent techniques can be employed for selectively engaging the revised shift control strategy described herein. For example, the revised shift control strategy could be engaged based on engine speed.

The launch control unit could be configured to provide additional functionality. The launch control unit could automatically activate a stopwatch function to record times, for example the time taken to accelerate from 0-100 km/h (0-62 mph). When engaged, the launch control unit could inhibit other vehicle functions, for example opening/closing of a roof on a convertible. Equally, when the launch control unit is activated, it could be configured to inhibit on-board systems, such as an air conditioning unit and/or a stop/start function, to reduce parasitic losses and further to improve vehicle acceleration. The launch control unit could be configured for use in a hybrid vehicle, for example having an electric fraction motor or a mechanical drive system (such as a flywheel) to operate in conjunction with the internal combustion engine. The launch control unit could control operation of the electric traction motor or the mechanical drive system to boost acceleration during part or all of the launch phase. The available boost could be displayed on the instrument cluster, optionally with additional information such as charging time. The boost display could also be used to indicate when the launch control system is inhibited, for example to allow cooling between launch events.

The launch control unit described herein can be applied to two or four wheel drive motor vehicles.

The launch control unit according to the present invention has been described with particular reference to an automatic transmission in combination with a torque converter. The torque converter provides a fluid coupling between the internal combustion engine and the drivetrain. The skilled person will appreciate that the launch control unit could be implemented in a vehicle having a (dry) clutch coupling.

Furthermore, the launch control unit could be implemented on hybrid vehicles combining an internal combustion engine with either an electric traction motor or a mechanical drive system (such as a flywheel energy store). For example, the launch control unit could be configured to control the application of torque to a driven wheel by the electric fraction motor or the mechanical drive system during a transmission upshift for the internal combustion engine. The launch control unit could also be used for a stepless transmission, for example a continuous variable transmission (CVT) or an infinitely variable transmission (IVT).

The invention claimed is:

1. A launch control unit for selectively engaging a revised shift strategy operable to control an internal combustion engine and/or an automatic transmission of a motor vehicle;
the launch control unit being configured to receive a brake signal from a foot brake and a torque demand from a throttle pedal;
wherein the launch control unit is operable to engage the revised shift control strategy in dependence on:
receipt of a brake signal greater than or equal to a lower brake threshold; and
receipt of a torque demand greater than or equal to a lower torque threshold.

2. A launch control unit as claimed in claim 1, wherein after engagement of the revised shift strategy, the launch control unit is operable to maintain engagement of the revised shift strategy in dependence on:
receipt of a brake signal less than or equal to the lower brake threshold; and
receipt of a torque demand greater than or equal to an upper torque threshold within a predefined time period of the receipt of the brake signal less than or equal to the lower brake threshold.

3. A launch control unit as claimed in claim 2, wherein the launch control unit is configured to maintain engagement of the revised shift control strategy as long as the torque demand is greater than or equal to said upper torque threshold.

4. A launch control unit as claimed in claim 1, wherein the launch control unit is configured to perform a set-up phase prior to engagement of the revised shift control strategy, the set-up phase comprising detecting a brake signal greater than or equal to the lower brake threshold at the same time as detecting a torque demand greater than or equal to a lower torque threshold.

5. A launch control unit as claimed in claim 1, wherein the launch control unit is configured to control operation of said transmission and/or the internal combustion engine during upshifts when the revised shift control strategy is engaged.

6. A launch control unit as claimed in claim 1, wherein said upper torque threshold corresponds to one of the following:
(a) a maximum throttle input;
(b) a predefined proportion of a maximum throttle input; or
(c) a throttle kickdown position.

7. A launch control unit as claimed in claim 1, wherein releasing the vehicle foot brake causes the brake signal to fall below the lower brake threshold.

8. A launch control unit as claimed in claim 1, wherein the launch control unit is configured to inhibit engagement of the revised shift control strategy if one or more of the following events is detected:
(a) the torque demand falls below a lower torque threshold;
(b) a vehicle speed is greater than or equal to a predefined speed limit before the revised shift control strategy is engaged;
(c) an engine speed exceeds a predefined engine limit;
(d) a steering angle exceeds a pre-defined angle;
(e) a pre-defined time period since the previous engagement of said revised shift control strategy has not expired;
(f) an oil temperature is outside a pre-defined operating range; and
(g) a pre-defined driving mode is not selected.

9. A launch control unit as claimed in claim 1, wherein the launch control unit is configured to disengage the revised shift control strategy if one or more of the following events is detected:
(a) an engine speed exceeds a predefined engine limit;
(b) a steering angle exceeds a pre-defined angle;
(c) a pre-defined time period since the previous engagement of said revised shift control strategy has not elapsed;
(d) a brake signal is received; and
(e) a measured vehicle speed is greater than or equal to a defined maximum vehicle speed.

10. A launch control unit as claimed in claim 1, wherein the lower torque threshold corresponds to an engine speed which is equal to or less than the stall speed of a torque converter for coupling the internal combustion engine to the automatic transmission.

11. A motor vehicle comprising a launch control unit as claimed in claim 1.

12. A launch control unit as claimed in claim 1, wherein the revised shift strategy is configured to modify the duration of a transmission shift and/or modify the engine output during a transmission shift.

13. A launch control unit as claimed in claim 12, wherein the revised shift strategy is configured to decrease or eliminate a torque reduction during the transmission shift.

14. A method of controlling engagement of a revised shift control strategy for controlling an internal combustion engine and/or an automatic transmission of a motor vehicle; wherein the method comprises engaging said revised shift control strategy in dependence on:
receipt of a brake signal greater than or equal to a lower brake threshold; and
receipt of a torque demand greater than or equal to a lower torque threshold.

15. A method as claimed in claim 14, wherein after engagement of the revised shift strategy, the method comprises maintaining engagement of the revised shift strategy in dependence on:
receipt of a brake signal less than or equal to the lower brake threshold; and
receipt of a torque demand greater than or equal to an upper torque threshold within a predefined time period of the receipt of a brake signal less than or equal to the lower brake threshold.

16. A method as claimed in claim 14, wherein the method includes a set-up phase comprising an increase in the brake signal above the lower brake threshold and a concurrent increase in the torque demand above a lower torque threshold.

17. A method claimed in claim 14, wherein the revised shift strategy is configured to modify the duration of a transmission shift and/or modify the engine output during a transmission shift.

18. A method as claimed in claim 14, wherein the revised shift strategy is configured to decrease or eliminate a torque reduction during the transmission shift.

19. A data processor programmed to perform a set of defined instructions to perform the method as claimed in claim 14.

20. A launch control unit for selectively engaging a revised shift control strategy operable to control an internal combustion engine and/or an automatic transmission of a motor vehicle;

the launch control unit being configured to receive a brake signal from a foot brake and a torque demand from a throttle pedal;

wherein the launch control unit is operable to engage said revised shift control strategy upon receipt of a torque demand greater than or equal to an upper torque threshold within a predefined time period of receipt of a brake signal less than or equal to the lower brake threshold.

* * * * *